United States Patent
Barnes et al.

(12)

(10) Patent No.: US 6,809,172 B2
(45) Date of Patent: Oct. 26, 2004

(54) POLYESTER POLYOLS AND THE USE OF POLYESTER FOR PRODUCING PUR CAST ELASTOMERS THAT HAVE AN IMPROVED RESISTANCE TO HYDROLYSIS

(75) Inventors: James-Michael Barnes, Breitscheid (DE); Michael Schneider, Köln (DE); Andreas Hoffmann, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/220,250

(22) PCT Filed: Feb. 19, 2001

(86) PCT No.: PCT/EP01/01828

§ 371 (c)(1),
(2), (4) Date: Aug. 29, 2002

(87) PCT Pub. No.: WO01/64768

PCT Pub. Date: Sep. 7, 2001

(65) Prior Publication Data

US 2003/0040597 A1 Feb. 27, 2003

(30) Foreign Application Priority Data

Mar. 2, 2000 (DE) ......................... 100 10 047

(51) Int. Cl.$^7$ ..................... C08G 18/42; C07C 67/08; C07C 69/34

(52) U.S. Cl. ............... 528/80; 252/182.24; 252/182.28; 528/81; 528/272; 528/308; 528/308.7; 528/308.8; 560/89; 560/127; 560/198; 560/224

(58) Field of Search ...................... 252/182.24, 182.28, 252/80, 81, 272, 308, 308.7, 308.8; 560/89, 127, 198, 224

(56) References Cited

U.S. PATENT DOCUMENTS

| 4,362,825 A | 12/1982 | Grabhoefer et al. | ........ 521/172 |
| 6,423,816 B1 | 7/2002 | Wamprecht et al. | ........ 528/302 |

FOREIGN PATENT DOCUMENTS

| EP | 0 017 060 | 10/1980 |
| FR | 2001223 | 9/1969 |

*Primary Examiner*—Rabon Sergent
(74) *Attorney, Agent, or Firm*—Joseph C. Gil; N. Denise Brown

(57) ABSTRACT

The polyester polyols according to the invention with an average equivalent weight in the range from 200 to 4,000, which were prepared by reacting α,ω-dicarboxylic acids with butane 1,4-diol, hexane 1,6-diol, propane 1,3-diol or pentane 1,5-diol and with polyols having 3 to 6 hydroxyl groups, are used for the preparation of PUR pourable elastomers with improved resistance to hydrolysis.

10 Claims, No Drawings

POLYESTER POLYOLS AND THE USE OF POLYESTER FOR PRODUCING PUR CAST ELASTOMERS THAT HAVE AN IMPROVED RESISTANCE TO HYDROLYSIS

The present invention provides polyester polyols which may be used for the preparation of PUR pourable elastomers with, i.a. improved resistance to hydrolysis.

BACKGROUND OF THE INVENTION

It is known to prepare PUR pourable elastomers by reacting polyester polyols with polyisocyanates. The polyester polyols have advantages over the well known polyether polyols, for example, they provide PUR elastomers with good overall mechanical properties in a particularly economic manner. The polyester polyol used in practice is often polyethylene adipate. Unfortunately, polyethylene adipate, like other polyester polyols, has the disadvantage that the elastomers prepared therefrom are susceptible to hydrolysis, which is prohibitive for many applications. In order to compensate for the disadvantage of susceptibility to hydrolysis of PUR elastomers, it is possible to add suitable anti-hydrolysis agents to the polyester polyols to be used, but this makes a corresponding production process less economic.

Moreover, in order to improve the resistance to hydrolysis of the polyester polyols to be used, it is technically possible to use relatively long-chain glycol and/or acid components to produce the polyester polyols, such as, for example, polybutylene adipate. Unfortunately, this is then associated with an increased risk of crystallisation during the preparation of the PUR elastomers. As a result, the elastomers obtained often have an undesirably high level of hardness at room temperature. Moreover, the high melting point of the polyester polyols having such a constitution is unfavourable for the processing thereof.

BRIEF SUMMARY OF THE INVENTION

The object of the present invention was to provide polyester polyols from which it is possible to prepare PUR pourable elastomers which have good resistance to hydrolysis without the mechanical properties such as low temperature performance and impact resilience being impaired and which can be processed easily (long casting time with short solidification time of the PUR system used).

The invention provides, therefore, polyester polyols with an average equivalent weight (calculated from the experimentally determined OH value) in the range from 200 to 4000, prepared by reacting a) $\alpha,\omega$-dicarboxylic acids or derivatives thereof with
b) butane 1,4-diol
c) hexane 1,6-diol
d) propane 1,3-diol or pentane 1,5-diol or a mixture thereof and
e) polyols having 3 to 6 hydroxyl groups, component b) being used in amounts from 51 mole % to 85 mole %, component c) in amounts from 7 mole % to 25 mole %, component d) in amounts from 7 mole % to 25 mole % and component e) in amounts from 0.2 mole % to 2.5 mole %, based on the total amount of polyols b) to e).

DETAILED DESCRIPTION OF THE INVENTION

According to the invention, preferred polyester polyols are those containing component b) in amounts from 60 mole % to 70 mole %, component c) in amounts from 12 mole % to 22 mole %, component d) in amounts from 12 mole % to 22 mole % and component e) in amounts from 0.75 mole % to 1.75 mole %, based on the total amount of polyols b) to e).

Suitable $\alpha,\omega$-dicarboxylic acids or derivatives thereof (structural component a)) include, in particular, those dicarboxylic acids having 2 to 12 carbon atoms, preferably 4 to 6 carbon atoms. The corresponding aliphatic dicarboxylic acids are more particularly preferred.

Examples of suitable dicarboxylic acids include succinic acid, glutaric acid, adipic acid, suberic acid, azelaic acid, sebacic acid, decane dicarboxylic acid, maleic acid, fumaric acid, phthalic acid, isophthalic acid and terephthalic acid, preferably adipic acid.

Preferred dicarboxylic acid derivatives include, for example, dicarboxylic acid anhydrides or dicarboxylic acid mono or diesters which are composed of alcohols having 1 to 4 carbon atoms and the above-mentioned dicarboxylic acids. Dicarboxylic acid esters which are composed of adipic acid and methanol, ethanol, ethane 1,2-diol or butane 1,4-diol are particularly preferred.

As mentioned, polyols having 3 to 6 hydroxyl groups are used as component e) according to the invention. Polyols having 3 hydroxyl groups are used in preference. More particularly, polyols to be used as component e) in the preparation of the polyester polyols according to the invention are those having 3 to 16 carbon atoms in the molecule, more particularly preferably 3 to 6 carbon atoms. Suitable examples include trimethylolpropane, glycerol, sorbitol and pentaerythritol.

The polyols of component e) may be used both individually and in mixture, the most advantageous mixing ratio depending on the intended use of the polyester polyols and being easy to determine by appropriate preliminary tests.

The polyester polyols according to the invention may be prepared both without a catalyst and in the presence of well known esterification catalysts, advantageously in an atmosphere of inert gases, e.g., nitrogen, helium and/or argon. The temperatures are about 150° C. to 300° C., preferably 180° C. to 230° C. It is possible to operate both at normal pressure and at reduced pressure (<100 mbar).

The reaction of components a) to e) mentioned is continued according to the invention until the desired acid value of less than 10, preferably less than 1, is reached for the polyester polyols.

Examples of suitable esterification catalysts include iron, cadmium, cobalt, lead, zinc, antimony, magnesium, titanium and/or zinc catalysts in the form of metals, metal oxides or metal salts.

Of course, it is also possible to carry out the preparation of the polyester polyols according to the invention in the liquid phase instead of in the melt, in the presence of suitable diluents and/or entrainers, such as benzene, toluene, xylene and/or chlorobenzene. The water produced during esterification is removed by azeotropic distillation.

The preparation of polyester polyols is inherently known and described, for example, in E. Müller, Houben-Weyl, Methoden der organischen Chemie, Thieme-Verlag, Stuttgart, vol. 14.

As mentioned, the polyester polyols according to the invention may be used for the preparation of polyurethane, particularly "CASE" applications (Coatings Adhesives Sealants/Elastomers) and fibres, particularly polyurethane pourable elastomers. These elastomers may be prepared both in cellular and in solid form.

The preparation of cellular to solid polyurethane elastomers takes place in a known way by reaction of a reaction mixture of the polyester polyols according to the invention with the polyisocyanates known from the literature, optionally in the presence of the well known chain extenders, blowing agents and other additives well known in PU chemistry, in such a way that the starting materials are caused to react whilst maintaining an isocyanate characteristic from 70 to 130.

The polyisocyanates, chain extenders, activators, blowing agents, auxiliaries and additives required to produce the polyurethane pourable elastomers are well known and described, for example, in R. Vieweg, A. Höchtlen (ed.): "Kunststoff Handbuch", vol. VIII, Carl-Hanser-Verlag, Munich, 1993, chapter 3.

Methods for the preparation of cellular to solid polyurethane elastomers are also well known. We refer in this connection to R. Vieweg, A. Höchtlen (ed.): "Kunststoff-Handbuch", vol. VIII, Carl-Hanser-Verlag, Munich, 1993, chapter 8.

The elastomers prepared using the new polyester polyols according to the invention find application in the manufacture of fibres and moulded articles of all kinds, preferably in mechanical engineering and in the transport sector. The cellular elastomers are particularly suitable for the manufacture of damping and suspension elements, the solid elastomers are used preferably in tyres, rolls, coatings and rollers and also in roller coatings and for the manufacture of belts of all kinds.

EXAMPLES

A. Preparation of Esters

Comparison Example 1

A commercial dry polybutylene adipate diol having a hydroxyl value of 52 mg KOH/g was used as a comparison.

Example 1
(According to the Invention)
Preparation of Polyester Polyol A 36.0 kg (0.4 mole) of butane 1,4-diol, 10.4 kg (0.1 mole) of pentane 1,5-diol, 11.8 kg (0.1 mole) of hexane 1,6-diol and 1.22 kg (0.009 mole) of trimethylolpropane were added to 82.61 kg (0.566 mole) of adipic acid in a heated reaction vessel (fitted with a sampling unit) with a distillation column (controllable reflux ratio) and tared distillation receiving vessel, and water produced was distilled (3 h) under an $N_2$ atmosphere up to a temperature of 180° C. and an acid value of about 40. After the addition of 22 g of $SnCl_2$ hydrate, polycondensation was continued whilst continuously reducing the pressure to 10 to 15 mbar and the temperature was raised to 230° C. in so doing (2 h). The alcohol loss due to side reactions (formation of THF etc.) or due to losses over the column was compensated for by replenishing the alcohols in the melt. As soon as an OH value of 44 and an acid value of about 0.4 was obtained, the reaction was ended by cooling to room temperature and filling the apparatus with $N_2$.

B. Preparation of Pourable Elastomer

Comparison Example 1
Polyol Formulation

The anti-hydrolysis agent Stabaxol® 1 (2 parts by wt.) was added to dry polybutylene adipate diol (98 parts by wt.) according to comparison example A.1 and stored at 80° C. for 16 hours and degassed under a reduced pressure of less than 100 mbar.

Stabaxol 1 is an anti-hydrolysis agent (a sterically hindered carbodiimide) from Rheinchemie.

Desmodur® PC from Bayer AG Leverkusen (50.5 parts by wt.) (modified 4,4'-MDI, NCO content: 26.4%) was stirred in. Dry butane 1,4-diol (9.38 parts by wt.) was then stirred in without bubble formation for 30 seconds and the reaction mixture poured into heated moulds (at about 110° C.).

The reaction was catalysed with DABCO® DC2 (0.001 parts by wt.) (producer: Air Products), dissolved in butane 1,4-diol.

After about 20 minutes, the castings were removed from the mould. No further heat treatment took place.

The castings reached their final hardness after seven days and exhibited the properties shown in Table 1.

If cold air circulates around the castings during removal from the mould or initial storage, this leads to an unwanted hardening of the moulded articles.

In order to determine this hardening tendency, a 6 mm thick sheet of the elastomer was stored, after removal from the mould, in a room at 6° C. to 10° C. in order to simulate typical winter conditions in a storage room. Another 6 mm thick sheet of the elastomer was stored in a very largely draught-free room heated to about 25° C. After 24 hours, both parts were stored for 30 minutes at 25° C. in order to equalise the temperatures (conditioning). Whereas the sheet stored at 25° C. had a Shore hardness of 84, the Shore A hardness of the sheet stored under cold conditions is 89 (see Table 1).

As the strongly temperature-dependent Shore A hardnesses of the sheets produced show, a consistent quality of the sheets during production cannot be guaranteed due to the temperature variations occurring.

Comparison Example 2

The preparation of the elastomer was repeated, as described in comparison example 1, with dry polybutylene adipate diol (98 parts by wt.), the monomer 4,4'-MDI (Desmodur® 44 from Bayer AG Leverkusen; 40.6 parts by wt.) and with 9.69 parts by wt. of butane 1,4-diol.

In order to determine the hardening tendency, operations were carried out as described in comparison example 1. The hardening tendency is very pronounced (see Table 1).

Example 1
(According to the Invention)

Dry polyester polyol A (preparation, see Example A.1), OH value 44 (100 parts by wt.), was degassed without an anti-hydrolysis agent at 80° C. and under a reduced pressure of less than 100 mbar.

The modified monomer MDI, Desmodur® PC (commercial product from Bayer AG, Leverkusen; 50.5 parts by wt.) was stirred in. Dry butane 1,4-diol (9.81 parts by wt.) was then stirred in without the formation of bubbles for 30 seconds and the reaction mixture poured into heated moulds (at about 110° C.).

The reaction was catalysed by DABCO® DC2 (0.004 parts by wt.) (producer: Air Products), dissolved in butane 1,4-diol.

After about 20 minutes, the castings were removed from the mould. No further heat treatment took place.

The castings reached their final hardness after seven days and exhibited the properties shown in Table 1.

In order to determine the hardening tendency, storage was carried out at various temperatures, as described in comparison example 1.

After 24 hours, both parts were stored for 30 minutes at 25° C. in order to equalise the temperatures (conditioning). Both sheet parts had a Shore A hardness of 84.

Example 2
(According to the Invention)

The preparation of the elastomer was repeated, as described in Example 1, with the monomer MDI Desmodur® 44 (commercial product from Bayer AG, Leverkusen) (39.8 parts by wt.) instead of Desmodur® PC and 9.91 parts by wt. of butane 1,4-diol. The castings reached their final hardness (Shore A 87) after seven days and exhibit the properties shown in Table 1. No hardening tendency on the part of the castings could be discerned. In order to estimate the hardening tendency, storage was carried out at various temperatures, as described in comparison example 1. The sheet parts stored at various temperatures had a Shore A hardness of 88 in each case (see Table 1).

As the examples according to the invention show, in view of the non temperature-dependent, constant Shore A hardness, a consistent quality on the part of the sheets produced is guaranteed.

Comparison Example 3

Dry polybutylene adipate according to comparison example A.1(110 parts by wt.) was degassed at 124° C. for 30 minutes and under a reduced pressure of less than 100 mbar.

Desmodur® 15 from Bayer AG, Leverkusen (21 parts by wt. of naphthalene 1,5-diisocyanate) was stirred in. After 2 minutes, a vacuum was gradually applied. After 15 minutes, the temperature rose no further and the exothermic reaction was halted.

Dry butane 1,4-diol (3.3 parts by wt.) was then stirred in without the formation of bubbles for 30 seconds and the reaction mixture was poured into hot moulds (about 110° C.).

After about 20 minutes, the castings were removed from the mould and then post-conditioned for 24 hours at 110° C.

The castings reached their final hardness after about 14 days and exhibited the properties shown in Table 1.

Example 3
(According to the Invention)

The dry polyester polyol according to Example A.1 (125.8 parts by wt.) was degassed at 127° C. for 30 minutes and under a reduced pressure of less than 100 mbar.

Desmodur® 15 from Bayer AG, Leverkusen (21 parts by wt.) naphthalene-1,5-diisocyanate) was stirred in. After 2 minutes, a vacuum was gradually applied. After 15 minutes, the temperature rose no further and the exothermic reaction was halted.

Dry butane 1,4-diol (3.3 parts by wt.) was then stirred in without the formation of bubbles for 30 seconds and the reaction mixture was poured into hot moulds (about 110° C.).

After about 20 minutes, the castings were removed from the mould and then post-conditioned for 24 hours at 110° C.

The castings reached their final hardness after about 14 days and exhibited the properties shown in Table 1.

It can be seen from Table 1 that the resistance to hydrolysis of the elastomers produced from the polyester polyol A according to the invention (see Examples 1–3) is better than the resistance to hydrolysis of the elastomers produced from the polybutylene adipate diol (see comparison example 1–3).

Whereas the elastomers produced from the polyester polyol A according to the invention exhibit a comparatively non temperature-dependent curve of tan delta and storage modulus over the temperature range under consideration, the elastomers produced from polybutylene adipate show a drastic temperature dependence of the tan delta and storage modulus in the range from 20° C. to 50° C. These results from the torsion pendulum test confirm that, at room temperature, the elastomers produced from polybutylene adipate are extremely hard, inelastic and, in this respect, also of low quality.

TABLE 1

|  |  |  | Comparison example 1 | Example 1 | Comparison example 2 | Example 2 | Comparison example 3 | Example 3 |
|---|---|---|---|---|---|---|---|---|
| Cold storage | Shore A hardness after 1 day | at 6° C. | 89 | 84 | 96 | 88 | — | — |
| Storage at 25° C. | Shore A hardness after 1 day | at 25° C. | 84 | 84 | 93 | 88 | — | — |
| | Mechanical properties (4 weeks after production) | | | | | | | |
| | Shore A | | 88 | 88 | 89 | 90 | 88 | 87 |
| | Shore D | | 32 | 31 | 35 | 33 | 34 | 27 |
| | Yield stress | MPa | 46 | 33 | 30 | 33 | 35 | 33 |
| | Impact resilience | % | 50 | 51 | 60.5 | 64 | 67 | 72 |
| | Compression set 22° C. | % | 11 | 9.3 | 14.8 | 10.5 | 22 | 10.5 |
| | Compression set 70° C. | % | 37 | 35.7 | 28.5 | 20.8 | 19.3 | 16.9 |
| | Torsion pendulum test | | | | | | | |
| | Tan delta at 20° C. | | 0.076 | 0.066 | 0.063 | 0.047 | 0.044 | 0.023 |
| | Tan delta at 50° C. | | 0.033 | 0.032 | 0.036 | 0.028 | 0.017 | 0.019 |
| | Tan delta at 110° C. | | 0.042 | 0.020 | 0.045 | 0.025 | 0.014 | 0.019 |
| | Storage modulus at 20° C. | MPa | 13.6 | 9.9 | 54 | 21.5 | 42 | 19.4 |
| | Storage modulus at 50° C. | MPa | 10.6 | 8.6 | 21.9 | 19.3 | 23.9 | 20.4 |
| | Storage modulus at 110° C. | MPa | 5.2 | 5.0 | 9.4 | 14.5 | 24.2 | 21.3 |
| | Ageing in a damp atmosphere (80° C., water) | | | | | | | |
| | After 9 days | | | | | | | |
| | Shore A | | 77 | 78 | n.d. | 90 | n.d. | n.d. |
| | Yield stress | MPa | 16.6 | 22.0 | n.d. | 23.6 | n.d. | n.d. |
| | After 14 days | | | | | | | |
| | Shore A | | Unus. | Unus. | 92 | 86 | Unus. | 81 |
| | Yield stress | MPa | Unus. | Unus. | 11.8 | 26.2 | Unus. | 30 |

Unus. = Sample is unusable (yield stress <10 MPa)
n.d. = Not determined

What is claimed is:

1. Polyester polyols with an average equivalent weight in the range from 200 to 4,000, consisting essentially of:
    a) α,ω-dicarboxylic acids or derivatives thereof, with
    b) butane 1,4-diol,
    c) hexane 1,6-diol,
    d) propane 1,3-diol or pentane 1,5-diol or a mixture thereof, and
    e) polyols having 3 to 6 hydroxyl groups,
wherein component b) is used in amounts from 65 mole % to 85 mole %, component c) in amounts from 7 mole % to 25 mole %, component d) in amounts from 7 mole % to 25 mole % and component e) in amounts from 0.2 mole % to 2.5 mole %, based on the total amount of components b), c), d), and e).

2. Polyester polyols according to claim 1, wherein component b) is used in amounts from 65 mole % to 70 mole %, component c) in amounts from 12 mole % to 22 mole %, component d) in amounts from 12 mole % to 22 mole % and component e) in amounts from 0.75 mole % to 1.75 mole %, based on the total amount of components b), c), d), and e).

3. A process for the production of polyester polyols with an average equivalent weight in the range from 200 to 4,000, comprising, reacting a) α,ω-dicarboxylic acids or derivatives thereof, with b) butane 1,4-diol, c) hexane 1,6-diol, d) propane 1,3-diol or pentane 1,5-diol or a mixture thereof and e) polyols having 3 to 6 hydroxyl groups, wherein component b) is present in amounts from 65 mole % to 85 mole %, component c) in amounts from 7 mole % to 25 mole %, component d) in amounts from 7 mole % to 25 mole % and component e) in amounts from 0.2 mole % to 2.5 mole %, based on the total amount of components b), c), d), and e).

4. A process for the production of polyester polyols according to claim 3, wherein component b) is present in amounts from 65 mole % to 70 mole %, component c) in amounts from 12 mole % to 22 mole %, component d) in amounts from 12 mole % to 22 mole % and component e) in amounts from 0.75 mole % to 1.75 mole %, based on the total amount of components b), c), d), and e).

5. A process for the production of polyurethane pourable elastomers comprising, reacting at least one polyisocyanate with a polyester polyol having an average eguivalent weight in the range from 200 to 4,000 and consisting essentially of:
    a) α,ω-dicarboxylic acids or derivatives thereof, with
    b) butane 1,4-diol.
    c) hexane 1,6-diol.
    d) propane 1,3-diol or pentane 1,5-diol or a mixture thereof, and
    e) polyols having 3 to 6 hydroxyl groups.
wherein component b) is used in amounts from 65 mole to to 85 mole %, component c) in amounts from 7 mole % to 25 mole %, component d) in amounts from 7 mole % to 25 mole % and component e) in amounts from 0.2 mole % to 2.5 mole %, based on the total amount of components b), c), d), and e).

6. The process of claim 5, wherein at least one chain extender is present during the reaction of the polyisocyanate and the polyester polyol.

7. The process of claim 6, wherein said chain extender comprises butane 1,4-diol.

8. A polyurethane pourable elastomer comprising the reaction product of at least one polyisocyanate with a polyester polyol having an average equivalent weight of 200 to 4,000 and consisting essentially of:
    a) α,ω-dicarboxylic acids or derivatives thereof, with
    b) butane 1,4-diol,
    c) hexane 1,6-diol,
    d) propane 1,3-diol or pentane 1,5-diol or a mixture thereof, and
    e) polyols having 3 to 6 hydroxyl groups,
wherein component b) is used in amounts from 65 mole % to 85 mole %, component c) in amounts from 7 mole % to 25 mole %, component d) in amounts from 7 mole % to 25 mole % and component e) in amounts from 0.2 mole % to 2.5 mole %, based on the total amount of components b), c), d), and e).

9. The elastomer of claim 8, additionally comprising at least one chain extender.

10. The elastomer of claim 9, wherein said chain extender comprises butane 1,4-diol.

* * * * *